(12) United States Patent
Heine et al.

(10) Patent No.: US 12,601,404 B2
(45) Date of Patent: *Apr. 14, 2026

(54) INTERNALLY CLAMPING RECTANGULAR SEAL

(71) Applicant: Konzelmann GmbH, Löchgau (DE)

(72) Inventors: Matthias Heine, Stuttgart (DE);
Michail Michailidis, Bönnigheim (DE);
Heino Kramp, Besigheim (DE)

(73) Assignee: Konzelmann GmbH, Löchgau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/979,868

(22) Filed: Dec. 13, 2024

(65) Prior Publication Data

US 2025/0116337 A1 Apr. 10, 2025

Related U.S. Application Data

(63) Continuation of application No. 17/438,965, filed as application No. PCT/EP2020/057634 on Mar. 19, 2020, now Pat. No. 12,203,552.

(30) Foreign Application Priority Data

Mar. 19, 2019 (DE) ..................... 10 2019 106 993.9

(51) Int. Cl.
*F16J 15/3272* (2016.01)
*F16J 15/34* (2006.01)

(52) U.S. Cl.
CPC ....... *F16J 15/3488* (2013.01); *F16J 15/3272* (2013.01)

(58) Field of Classification Search
CPC ........................... F16J 15/3488; F16J 15/3272
See application file for complete search history.

(56) References Cited

U.S. PATENT DOCUMENTS 1,369,104 A 2/1921 Hendrickson
1,475,783 A 11/1923 Behnke
(Continued)

FOREIGN PATENT DOCUMENTS

DE 69522093 T2 4/2002
DE 102012206676 A1 10/2013
(Continued)

OTHER PUBLICATIONS

"Investigations on function and design of rectangular seals for rotating connections" (Mirco Gronitzki, Gottfried Wilhelm Leibniz University Hanover, 2006)(207 pages).
(Continued)

*Primary Examiner* — Vishal A Patel
(74) *Attorney, Agent, or Firm* — Lucian Wayne Beavers; Patterson Intellectual Property Law, PC

(57) ABSTRACT

A seal for sealing a shaft with respect to a housing can be inserted into a groove disposed circumferentially on a shaft bore. The seal is interrupted along its circumferential direction at a joint and two ring-end sections are formed. The seal has an outer surface facing radially outwards, an inner clamping surface facing radially inwards and opposing flank surfaces facing in the axial direction. At least one contact ramp is disposed on at least one ring-end section. At least one contact ramp is oriented obliquely with respect to the circumferential direction and obliquely with respect to the radial direction of the rectangular seal. The at least one contact ramp, starting from a non-stressed state of the rectangular seal, forms a first mechanical contact, pointing in the circumferential direction, between the opposing ring-end sections when the radius of the rectangular seal is reduced by prestressing the rectangular seal.

20 Claims, 9 Drawing Sheets

(56) References Cited

U.S. PATENT DOCUMENTS

| | | | |
|---|---|---|---|
| 3,377,073 | A | 4/1968 | Harney |
| 3,887,198 | A | 6/1975 | McClure et al. |
| 4,449,721 | A | 5/1984 | Tsuge |
| 5,632,494 | A | 5/1997 | Oka |
| 2006/0055119 | A1 | 3/2006 | Riken |
| 2009/0051126 | A1 | 2/2009 | Keeven |
| 2015/0048573 | A1 | 2/2015 | Mayer |
| 2018/0195616 | A1 | 7/2018 | Gronitzki |
| 2021/0270373 | A1 | 9/2021 | Laage |

FOREIGN PATENT DOCUMENTS

| | | | |
|---|---|---|---|
| DE | 202014006271 | U1 | 11/2015 |
| DE | 102014011534 | A1 | 2/2016 |
| EP | 1992851 | A1 | 11/2008 |
| FR | 2249270 | A1 | 5/1975 |
| JP | 09217836 | A | 8/1997 |
| WO | 2016020058 | A1 | 2/2016 |
| WO | 2017186905 | A1 | 11/2017 |
| WO | 2019243123 | A1 | 12/2019 |

OTHER PUBLICATIONS

Co pending corresponding U.S. Appl. No. 17/252,351, filed Dec. 15, 2020, 34 pages.

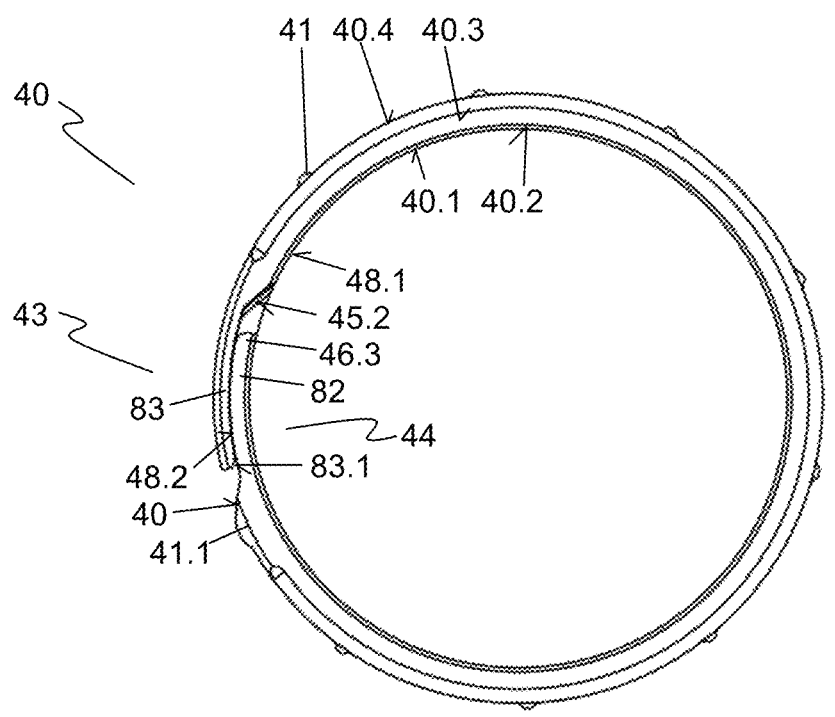
Fig. 15
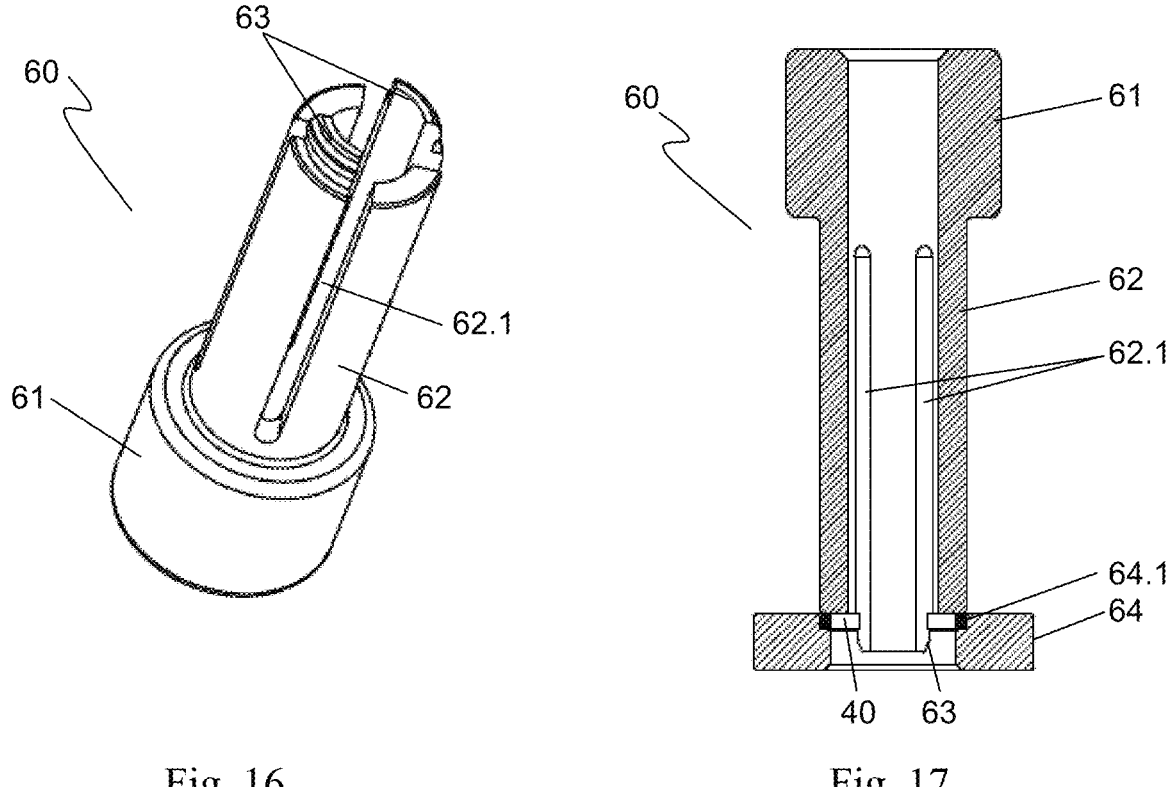
Fig. 16                                Fig. 17

INTERNALLY CLAMPING RECTANGULAR SEAL

BACKGROUND OF THE DISCLOSURE

Field of the Disclosure

The invention relates to an internally clamping rectangular seal for sealing a shaft with respect to a housing, wherein the rectangular seal can be inserted into a groove disposed circumferentially on a shaft bore, wherein the rectangular seal is interrupted along its circumferential direction at a joint and two ring-end sections are formed, and wherein the rectangular seal has an outer surface facing radially outwards, an inner clamping surface facing radially inwards and opposing flank surfaces facing in the axial direction.

Description of the Prior Art

Rectangular seals are used, for instance, to seal rotary unions in gearboxes. Such rotary unions are used to control rotating equipment and to supply them with a fluid. For instance, it is known to operate actuators by means of pressurized oil, which is supplied via the rotary unions. In a typical design of such a rotary union, a shaft rotating within a housing has a central bore and at least one radial bore extending therefrom, which opens into a pressure chamber. The pressure chamber is delimited by the shaft and the housing. The fluid is fed to the pressure chamber via the housing or via the bores in the shaft and discharged at the opposite end via the bores or the housing. Rectangular seals are provided on both ends of the pressure chamber to seal the gap formed between the shaft and the housing. Because the fluid can be pressurized to high pressures and the shaft can rotate at high speeds, the rectangular seals are subject to high mechanical and thermal stress.

The rectangular seals are guided in grooves, which are usually molded into the shaft. In such an arrangement with an externally clamping rectangular seal, the sealing pairs lie between the flank surfaces of the rectangular seal and the flanks of the groove in the shaft in which the rectangular seal is inserted, and between the outer circumferential surface of the rectangular seal and the surface of the shaft bore of the housing. Outer clamping rectangular seals are often formed from high-temperature thermoplastics. The former are open at one point along their circumference, where they form a joint, also called a buckle. The interruption permits a rectangular seal to be expanded for assembly such that it can be slid along the shaft to the groove and installed therein. Different buckle geometries are known for the joints, for instance a butt joint, an overlap joint, an I-buckle or step buckles. Owing to its design, the buckle area has an inferior sealing effect.

Internally clamping seals are inserted in grooves formed in the surface of the shaft bore of the housing circumferentially to the shaft. The sealing pairs are formed between the flank surfaces of the rectangular seal and the flanks of the groove made in the housing, and between the inner circumferential surface of the rectangular seal and the outer surface of the shaft.

Internally clamping seals are mainly designed as cast rings with different types of butt joints. In comparison, externally clamping rectangular seals made of a polymer have the advantage of a greater variety of buckles combined with significantly lower leakage. However, not all the numerous known buckle geometries can be implemented in the case of internally clamping, rectangular polymer seals, because for those only the buckle geometries permitting directional installation can be implemented. In the case of such directional installation, it has to be ensured that, in a specified sequence, first one first buckle end is inserted into the groove located in the housing and subsequently the other buckle end is inserted. For this purpose, the buckle ends of the rectangular seals first have to be fitted and installed either axially or radially offset from each other, which results in a very complex and time-consuming assembly. In the process, the rectangular seals have to be compressed for the twisted ring diameter to become significantly smaller than the diameter of the shaft bore in the housing.

SUMMARY OF THE DISCLOSURE

The invention addresses the problem of creating an internally clamping rectangular seal which permits a non-directional installation for a variety of buckle types.

The problem of the invention is solved in that at least one contact ramp is disposed at at least one ring-end section, in that the at least one contact ramp is oriented obliquely with respect to the circumferential direction and obliquely with respect to the radial direction of the rectangular seal, and in that the at least one contact ramp, starting from a non-stressed state of the rectangular seal, forms a first mechanical contact, pointing in the circumferential direction, between the opposing ring-end sections when the radius of the rectangular seal is reduced by prestressing the rectangular seal.

The radial direction faces radially outwards from a central axis of the rectangular seal. It is therefore perpendicular to the circumferential direction. In each section of the rectangular seal, the circumferential direction faces in the direction of its tangent.

If the rectangular seal is prestressed by a force preferably directed radially inwards such that its radius is reduced, the ring-end sections move towards each other in the circumferential direction. If the ring-end section opposite to the contact ramp meets the contact ramp, it is deflected radially outwards or inwards depending on the inclination of the contact ramp. The ring-end sections slide radially on top of each other. A flat spiral is formed. The inclination of the at least one contact ramp determines which of the two ring-end sections is deflected radially outwards and which is deflected radially inwards. For installation in a groove made in a housing, the rectangular seal is prestressed such that its outer diameter is smaller than the shaft bore made in the housing. The rectangular seal can now be inserted into the shaft bore in the axial direction. In this case, the center axis of the rectangular seal is oriented in the direction of the center axis of the shaft bore. When the rectangular seal reaches the position of the groove, it can relax again, wherein its outer radius increases and the rectangular seal snaps into the groove. The orientation of the contact ramp defines which of the two ring-end sections is radially on the outside when the rectangular seal is prestressed, i.e., which is inserted into the groove first and which second. In this way, buckle geometries can be provided which require a predetermined sequence when bringing the ring-end sections together. The rectangular seal can advantageously be inserted into the shaft bore in both possible orientations, in which its center axis is oriented in the direction of the center axis of the shaft bore. This means there is no directional installation, which significantly facilitates assembly.

Ease of assembly of the rectangular seals can be achieved by inclining the at least one contact ramp relative to the radial direction at an angle of 30° to 80°, preferably of 45° to 80°. In an angular range from 30° to 80°, the ring-end sections slide securely over each other when the rectangular seal is prestressed. In an angular range between 45° and 80°, the additional force required for the radial adjustment of the ring-end sections is comparatively low.

Preferably, provision can be made that the at least one contact ramp has the same angle of inclination relative to the radial direction and/or the circumferential direction along its entire extension or that the angle of inclination of the at least one contact ramp changes relative to the radial direction and/or the circumferential direction along the extension of the contact ramp. Contact ramps having a constant angle of inclination are easy to manufacture. Contact ramps having changing angles of inclination make for differing radial displacements of the ring-end sections relative to each other depending on the existing prestress of the rectangular seal for the same change in its circumference. This means, for instance, that the force required when prestressing the rectangular seal can be evened out over the required adjustment distance by flattening the inclination of the contact ramp relative to the circumferential direction in the direction of motion of the opposing ring-end section.

Preferably, provision can be made that the at least one contact ramp along the joint direction of the opposing ring-end section is inclined towards the inner clamping surface of the rectangular seal when the radius of the rectangular seal is reduced by prestressing the rectangular seal, or that the at least one contact ramp along the joint direction of the opposing ring-end section is inclined towards the outer surface of the rectangular seal when the radius of the rectangular seal is reduced by prestressing the rectangular seal. When the contact ramp is inclined towards the inner clamping surface of the rectangular seal, the opposing ring-end section slides radially under the ring-end section, at which the contact ramp is disposed. When the contact ramp is inclined towards the outer clamping surface of the rectangular seal, the opposite ring-end section slides radially above the ring-end section, at which the contact ramp is disposed. By suitably orienting the inclination of the contact ramp, the ring-end section that is to be inserted first into the groove made in the housing can in this way be disposed radially on the outside, and the ring-end section that is to be inserted into the groove subsequently can be disposed radially on the inside.

A possible variant of the invention can be such that at least one first-contact section is disposed on the ring-end section opposite to the ring-end section having the at least one contact ramp, that, when the radius of the rectangular seal is reduced by prestressing the rectangular seal, the at least one first-contact section forms a first mechanical contact between the opposing ring-end sections pointing in the circumferential direction, and that the at least one first-contact section is rounded off facing the at least one contact ramp or has a chamfer oriented to match the inclination of the contact ramp. When the radius of the rectangular seal is reduced by prestressing, the first-contact section of one ring-end section collides with the contact ramp disposed on the opposing ring-end section and slides along that depending on latter's inclination. The ring-end sections are thus pushed radially on top of each other. By rounding off the first-contact section, a uniform sliding motion of the first-contact section on the contact ramp is achieved. This also applies if the first-contact section is not oriented optimally with the contact ramp. Sharp edges in the contact area between the ring-end sections, which can result in jamming when the rectangular seal is prestressed, are prevented. If the chamfer of the initial contact section is oriented to match the inclination of the contact ramp, large-surface contact between the ring-end sections is achieved. As a result, the contact ramp and the chamfer slide smoothly on top of each other, even in case of high forces acting thereon. Deformation of the first-contact section and the contact ramp is reliably prevented by the comparatively large contact surface.

In addition to radial adjustment of the ring-end sections relative to each other, an axial adjustment can also be effected by prestressing the rectangular seal. The axial adjustment may be desired, for instance, to achieve a smooth and safe insertion of the rectangular seal into the assigned groove. A desired axial adjustment can be achieved by a matching inclination of the contact ramp, which then preferably has an axial component. However, it can also be caused unintentionally, especially during manual assembly of the rectangular seal with an appropriate assembly tool. To ensure that one ring-end section rests radially on the outside of the second ring-end section even when the ring-end sections are axially displaced relative to each other, a blocking element can be provided to act between the opposing ring-end sections and the blocking element can delimit any axially directed displacement of the ring-end sections relative to each other. The blocking element determines the extent to which the ring-end sections can be axially offset from each other, i.e. the minimum overlap of the ring-end sections.

A sufficiently large mutual radial support of the ring-end sections can be achieved by the blocking element delimiting an axially directed displacement of the ring-end sections in such a way that the ring-end sections overlap in the axial direction by at least 15% of their dimension measured in the axial direction.

Preferably, when the rectangular seal is stressed to a smaller radius than in the unstressed state, the blocking element may be provided to engage or disengage both ring-end sections once a predetermined end radius of the rectangular seal is reached. If the blocking element engages with both ring-end sections after reaching the specified end radius, it is ensured that the ring-end sections do not move axially relative to each other beyond the permissible range during installation of the rectangular seal in an assigned groove. If the blocking element is no longer engaged with both ring-end sections once the specified end radius has been reached, the axial guidance is only effective while the rectangular seal is being prestressed. Prestressing can be achieved, for instance, by inserting the rectangular seal into a tapered sleeve along the direction of its center axis. In this process, a suitable tool transmits high transverse forces to the rectangular seal. The blocking element prevents the ring-end sections from moving axially relative to each other by more than a permissible range due to the required transverse forces. Once the specified end radius has been reached, only comparatively small axial forces act on the rectangular seal against the direction of insertion. In this last assembly section, therefore, no additional axial blocking of the ring-end sections relative to each other is required. Depending on the buckle geometry used, snapping the ring-end sections into the groove can be simplified if there is no axial blocking of the ring-end sections relative to each other in this final assembly section.

A matching form-fit connection can be used to achieve the engagement of the blocking element with one or both of the ring-end sections. However, provision can also be made that the engagement of the blocking element is based on a fixed connection to one of the ring-end sections, preferably that the blocking element is integrally connected to one of the ring-end sections.

A rectangular seal according to the invention can be such that along the direction of motion of the respective opposite ring-end sections, when the radius of the rectangular seal is reduced by prestressing, the at least one contact ramp and the first-contact section merge into one contact face each, and that the contact faces are preferably oriented to extend in the circumferential direction of the rectangular seal. When the rectangular seal is prestressed, the first-contact section initially slides along the contact ramp. When the first-contact section reaches the end of the contact ramp, the ring-end sections are radially offset from each other. With a further reduction in the radius of the rectangular seal, the ring-end sections now slide past each other in the circumferential direction. The contact surfaces of the ring-end sections rest against each other. The radius of the rectangular seal can in that way be reduced to the dimension required for insertion into the shaft bore, wherein one ring-end section remains disposed radially on the outside and the other ring-end section remains disposed radially on the inside.

Usually, centering cams are provided on the outer surface of the internally clamping rectangular seal, which centering cams provide radial guidance of the rectangular seal within the groove. These centering cams are preferably arranged at regular intervals from one another along the circumference of the internally clamping rectangular seal. When the rectangular seal is prestressed to a smaller radius, it can happen that the ring-end section displaced radially outwards slips over the centering cam closest to the joint. To prevent the outer ring-end section from slipping off the centering cam in the axial direction, provision can be made that centering cams arranged at a distance from one another in the circumferential direction are disposed on the outer surface of the rectangular seal and that at least one of the centering cams extends transversely to the circumferential direction along the width of the rectangular seal measured in the axial direction. Preferably, the centering cam closest in the joint direction of the outwardly displaced ring-end section extends across the entire width of the rectangular seal. The ring-end section displaced outwards then rests on the centering cam across its entire width measured in the axial direction. There is therefore no risk of the ring-end section displaced outwards slipping axially off the centering cam and thus off the inwardly displaced ring-end section.

A shaft can then be easily inserted into a shaft bore and into a rectangular seal disposed therein if provision is made that one insertion bevel each oriented obliquely from the flank surfaces to the inner clamping surface is disposed at the transitions from the flank surfaces to the inner clamping surface. The inside diameter of the internally clamping rectangular seal has at most the nominal dimension of the shaft diameter of the shaft which it runs up to. The insertion bevel expands the rectangular seal mounted in the groove when the shaft is inserted, i.e., the shaft can be pushed into the rectangular seal and its inner clamping surface fits tightly against the outer surface of the shaft. If insertion bevels are provided at both transitions from the flank surfaces to the inner clamping surface, the shaft can be inserted into the rectangular seal from both ends. In this way, the rectangular seal can be inserted into the groove in both possible axial orientations.

Low leakage of a rotary union sealed by the rectangular seal can be achieved by injection molding the internally clamping rectangular seal from a polymer material that can be processed with high precision. In conjunction with the generally high thermal and mechanical stresses, modified high-temperature materials such as polyacrylic ether ketones, polyimides, polyamide imides, polyphtalamides, polyetherimides (PEI, PBMI), polyether ketones, polytetrafluoroethylene (PTFE) or polyamides (PA) can be used.

In particular, provision may be made that the polymer material is mixed with at least one filler and/or reinforcing material. The filler and/or the reinforcing material result in a high dimensional stability of the rectangular seal. They ensure a sufficiently high contact pressure of the internally clamping rectangular seal against the shaft to achieve a good sealing effect with low friction losses.

According to a preferred variant of the embodiment of the invention, provision may be made that the ring-end sections have meshing buckle elements. The ring-end sections form a contour area to ensure a sealing effect. The buckle elements can form form-fitting elements. In that case, the at least one contact ramp according to the invention results in the buckle elements (form-fitting elements) being arranged in the correct orientation to each other and thus being assembled in the correct sequence. In this way, buckle geometries having low leakage rates can be implemented. Furthermore, this design according to the invention permits reliable assembly in deep bores.

BRIEF DESCRIPTION OF THE DRAWINGS

The invention is explained in greater detail below based on the exemplary embodiments shown in the drawings. In the Figures:

FIG. 15 shows a second side view of the internally clamping rectangular seal having a single-step buckle shown in FIGS. 11 to 14 in a partially prestressed state, FIG. 16 shows a perspective view of an assembly tool, FIG. 17 shows a sectional view of the assembly tool shown in FIG. 16 having a ring mount.

DETAILED DESCRIPTION

Figure 1:
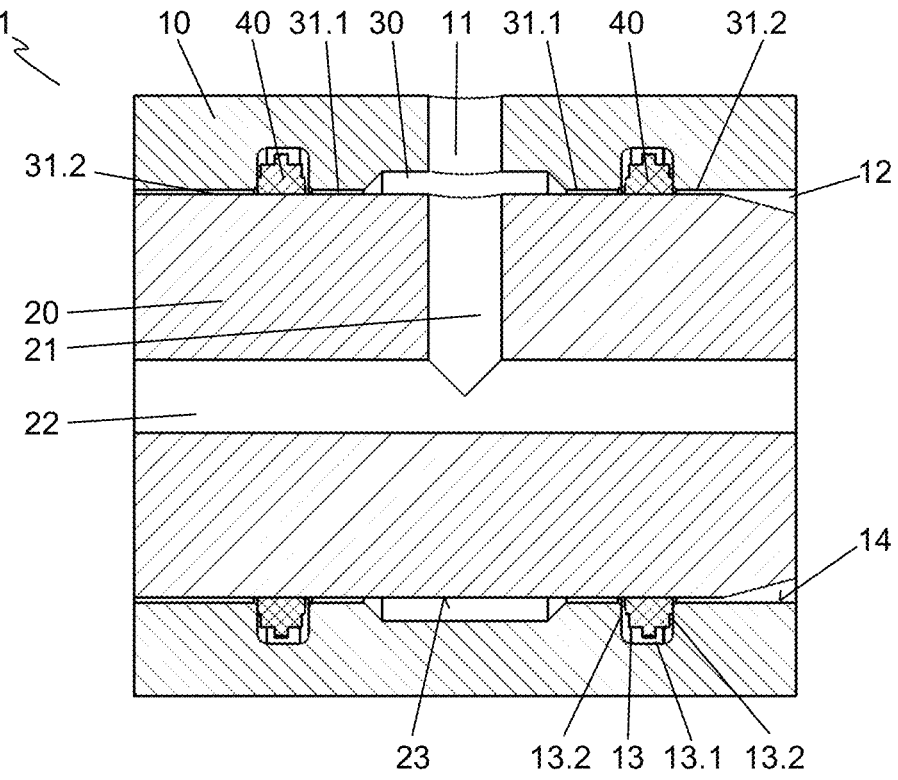
FIG. 1 shows a schematic lateral sectional view of a rotary union having two internally clamping rectangular seals.

FIG. 1 shows a schematic lateral sectional view of a rotary union 1 having two internally clamping rectangular seals 40.

The illustration and the illustrations of the subsequent FIGS. 2 to 18 are schematic and not to scale.

Figure 2:
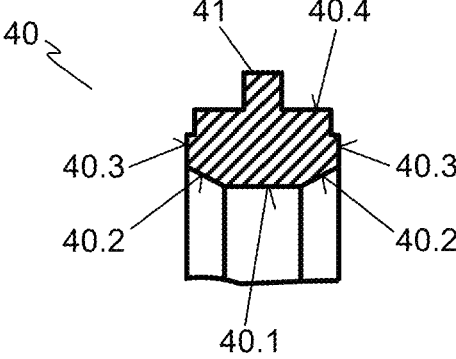
FIG. 2 shows a schematic sectional view of an internally clamping rectangular seal.

The internally clamping rectangular seals 40 are each disposed in a groove 13. The two grooves 13 are machined circumferentially to a shaft 20 into an inner surface 14 of a shaft bore 12 of a housing 10. They each have two groove flanks disposed axially spaced apart and radially oriented and are closed off opposite to the shaft 20 by a groove bottom 13.1. The shaft 20 is guided for rotation about its longitudinal axis in the shaft bore 12. Only a section of the housing 10 and the shaft 20 is shown. A pressure chamber 30 is formed in the housing 10 between the internally clamping rectangular seals 40 circumferentially to the shaft 20. The pressure chamber 30 is connected to a central bore 22 of the shaft 20, for instance, via a radially oriented oil feed 21 incorporated in the shaft. The central bore 22 extends axially along the central longitudinal axis of the shaft 20. An inlet 11 penetrates the housing 10 in the area of the pressure chamber 30. The inlet 11 provides access to the pressure chamber 30. A gap is formed between the shaft 20 and the housing 10 to permit the free rotation of the shaft 20 within the shaft bore 12. The two internally clamping rectangular seals 40 are used to seal the gap on both ends of the pressure chamber 30. An inner exit gap 31.1 is thus formed facing the pressure chamber 30 and an outer exit gap 31.2 faces away from pressure chamber 30. The internally clamping rectangular seals 40 each have an inner clamping surface 40.1, as shown in FIG. 2, pressed against an outer surface 23 of the shaft 20.

In the exemplary embodiment shown, the rotary union 1 is part of a vehicle transmission not shown. In the transmission, pressurized oil is used to operate actuators, such as a clutch or other shift elements. The oil is fed to the pressure chamber 30 via the inlet 11 of the housing 10. The oil supply 21 is used to feed the oil into the central bore 22 of the shaft 20 and along the latter to the actuators via the oil feed while the shaft 20 rotates. In a reversal of function, oil can also be removed from the central bore 22 through the rotary union 1. The highly pressurized oil is then fed from the central bore 22 via the oil feed 21 to the pressure chamber 30 and from there to the inlet 11 of the housing 10. From the inlet 11, the oil can be fed to an actuator, for instance.

Depending on the application, the oil can have a pressure of, for instance, 8 MPa and the shaft 20 can be operated at speeds of up to 15 000 rpm. The internally clamping rectangular seals 40 seal the pressure chamber 30 along the gap formed between the shaft 20 and the housing 10 to maintain the required pressure and to keep any oil leakage low. Owing to the high pressure and high speeds, the rectangular seals 40 are subjected to high mechanical and thermal stress. Of course, the rectangular seals 40 according to the invention can also be used for smaller loads.

The seals 40 shown in FIG. 1 and the figures described below are made of a plastic. For this purpose, preferably high-temperature materials such as polyacrylic ether ketones (PEK, PEEK) or polyimides (PI, PBMI, PAI, PEI) or any other material suitable for the application, such as mentioned above, are used. Fillers and reinforcing materials are preferably added to the plastics.

The rectangular seals 40 are preferably manufactured by means of an injection molding process. However, it is also conceivable to produce the rectangular seals 40 in other ways by shaping them via the melt or also by means of machining.

According to another conceivable embodiment of the invention, the rectangular seals 40 may be made of a polytetrafluoroethylene (PTFE). It is also conceivable to manufacture the rectangular seals 40 from cast materials, in particular as gray cast iron seals.

FIG. 2 shows a schematic sectional view of a rectangular seal 40. The sectional surface extends radially in the area of a centering cam 41. The centering cam 41 is formed on a radially outer surface 40.4 of the rectangular seal 40. The outer surface 40.4 is oriented transversely to the radial direction of the rectangular seal 40. Laterally, the rectangular seal 40 forms radially oriented flank surfaces 40.3. The flank surfaces 40.3 are spaced apart in the axial direction. They each merge into the outer surface 40.4 arranged at an angle to the flank surfaces 40.3 via a shoulder tapering the rectangular seal 40. An inner clamping surface 40.1 of the rectangular seal 40 is disposed opposite to the outer surface 40.4. The inner clamping surface 40.1 is formed by the inner lateral surface of the rectangular seal 40. Insertion bevels 40.2 can be provided at the transitions from the flank surfaces 40.3 to the inner clamping surface 40.1. The insertion bevels 40.2 are each oriented at an angle to the inner clamping surface 40.1. They form a transition from the inner clamping surface 40.1 to the flank surfaces 40.3 oriented obliquely to the radial direction.

The rectangular seal 40 formed in this way can be inserted into a groove 13 on a shaft bore 12 of a housing 10, as shown in FIG. 1. The outer surface 40.4 points in the direction of the groove bottom 13.1. The centering cams 41 can at least temporarily rest against the groove bottom 13.1, thereby radially centering the rectangular seal 40. The insertion bevels 40.2 are used to facilitate the insertion of the shaft 20 into the shaft bore 12. The inner diameter of the non-prestressed rectangular seal 40 has at most the nominal dimension of the outer diameter of the shaft 20. When the shaft 20 is pushed into the shaft bore 12, it first encounters one of the insertion bevels 40.2. It centers the shaft 20 relative to the rectangular seal 40. Furthermore, the rectangular seal 40 is expanded in such a way that the shaft 20 can be inserted. Preferably, insertion bevels 40.2 are provided at both opposite transitions from the flank surfaces 40.3 to the inner clamping surface 40.1. The shaft 20 can thus be inserted into the rectangular seal 40 from either direction. Particularly advantageously, the rectangular seal 40 can be disposed in both possible orientations in the relevant groove 13 in this way.

After installation, the internally clamping rectangular seal 40 clamps inwards onto the shaft 20 backed by pressure. The sealing pairs are formed between the flank surfaces 40.3 of the rectangular seal 40 and the groove flanks 13.2 of the groove 13 on the housing end, and between the inner clamping surface 40.1 of the rectangular seal 40 and the outer surface 23 of the shaft 20.

Figure 3:
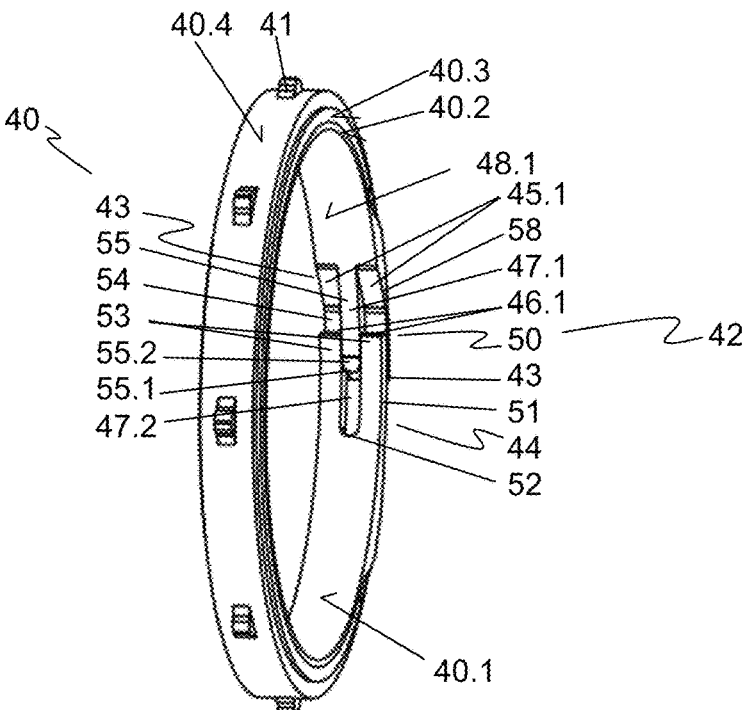
FIG. 3 shows a perspective view of an internally clamping rectangular seal with an I-buckle having a first first-contact section.

FIG. 3 shows a perspective view of an internally clamping rectangular seal 40 having an I-buckle 50 having a first first-contact section 46.1.

As described for FIG. 2, the inner circumferential surface of the internally clamping rectangular seal 40 forms its inner clamping surface 40.1, the opposite lateral surfaces form the flank surfaces 40.3, and the outer circumferential surface forms the outer surface 40.4. The centering cams 41 are arranged equidistant along the outer surface 40.4 in the circumferential direction.

The rectangular seal 40 is open at a joint 42. The ends of the rectangular seal 40 facing the joint 42 form a first ring-end section 43 and, opposite thereto, a second ring-end section 44. The rectangular seal 40 may also be referred to as a seal ring 40 including the two ring-end sections 43 and 44 forming the joint 42 interrupting the seal ring 40 along a circumferential direction. The joint 42 is also referred to as a buckle. A variety of different buckle types are known, for instance, butt buckles, overlapping buckles or stepped buckles. In the perspective selected in FIG. 3, the inside of the joint 42 is oriented towards the viewer.

In the rectangular seal 40 shown in FIG. 3, the joint 42 is designed as an I-buckle 50. A tee 58 having a cover section 54 and a bar 55 formed thereon is formed on the first ring-end section 43, and a fork 51 is formed on the second ring-end section 44. The cover section 54 is disposed radially outwards relative to the fork 51. In the shown state of the rectangular seal 40, the cover section 54 partially covers the fork 51. Directed radially inwards, the bar 55 is formed at the cover section 54. The bar 55 is oriented in the circumferential direction along its lengthwise extension. Axially, the bar 55 is located in the center of the rectangular seal 40. It engages with a space formed between two prongs 53 of the fork 51. The space formed between the prongs 53 also extends in the circumferential direction of the rectangular seal 40 and is disposed axially in the center of the rectangular seal 40. The bar 55 can therefore be displaced in the circumferential direction along the intermediate space. In the axial direction, the prongs 53 of the fork 51 block the bar 55. The bar 55 thus forms a blocking element 47.1 and the intermediate space forms a guide 47.2. The engagement of the blocking element 47.1 disposed on the first ring-end section 43 with the guide 47.2 provided on the second ring-end section 44 blocks the axial displacement of the ring-end sections 43, 44 relative to each other. In the case of the rectangular seal 40 shown in FIG. 3, the interaction of the blocking element 47.1 and the guide 47.2 is predetermined in such a way that the ring-end sections 43, 44 lie radially one on top of the other with no or only a slight axial offset. It is conceivable to design the blocking element 47.1 and the guide 47.2 in such a way that an axial offset of the ring-end sections 43, 44 relative to each other is permissible. Preferably, it is ensured that the ring-end sections 43, 44 overlap in the axial direction by at least a predetermined amount resulting from the difference in thermal expansion between the ring and the housing during operation.

The bar 55 forms a leading bar edge 55.1 at its end facing the opposite second ring-end section 44. The leading bar edge is disposed opposite to a base of the fork 52 of the fork 51. Towards the interior of the rectangular seal 40, the front bar edge 55.1 merges into a termination surface of the bar 55 directed radially inwards via a chamfer 55.2, which bar forms a continuous extension of the inner clamping surface 40.1. Accordingly, the prongs 53 of the fork 51 also form inner termination surfaces in extension of the inner clamping surface 40.1. The extensions of the prongs 53 and the bar 55 ensure that the internally clamping rectangular seal 40 is in sealing contact with the shaft 20 shown in FIG. 1 even in the area of the joint 42.

The fork 51 and the cover section 54 are formed thinned in the radial direction with respect to the areas of the rectangular seal 40 located outside the joint 42. They are oriented offset from each other in the radial direction. The surface of the cover section 54 directed inwards merges into the inner clamping surface 40.1 of the rectangular seal 40 via first contact ramps 45.1. In its section facing the first contact ramps 45.1, the inner clamping surface 40.1 forms an internally directed contact face 48.1. The bar 55 separates the first contact ramps 45.1 from one another. They are disposed opposite to the ends of the prongs 53 of the fork 51 in the circumferential direction of the rectangular seal 40. The ends of the prongs 53 form the first first-contact sections 46.1.

Figure 4:
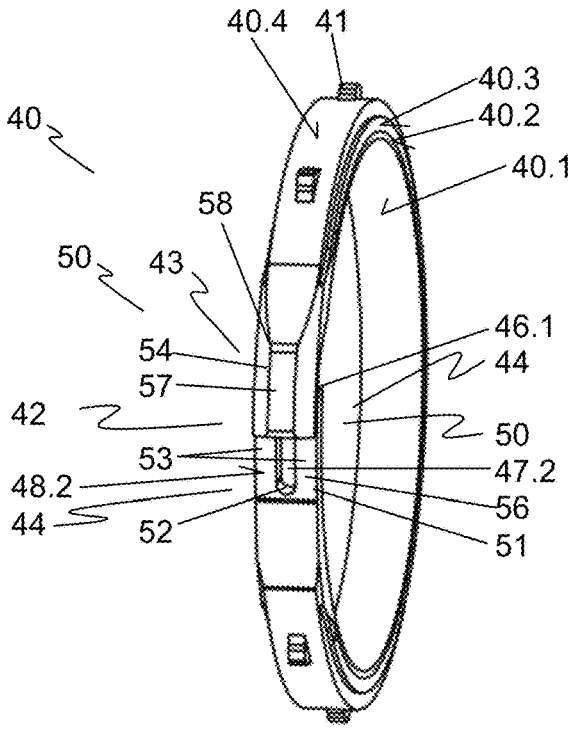
FIG. 4 shows a further perspective view of the internally clamping rectangular seal shown in FIG. 3.

FIG. 4 shows a further perspective view of the internally clamping rectangular seal 40 shown in FIG. 3. Here, the internally clamping rectangular seal 40 is oriented such that the outside of the joint 42 faces the viewer.

A centering section 57 terminates the cover section 54 at the outside. The centering section 57 forms an elevation directed radially outwards relative to the outer surface 40.4. Its radially outer surface is thus on the same radius as the outer terminations of the centering cams 41. In the case of an internally clamping rectangular seal 40 disposed in a groove 13, the centering section 57 is located opposite to the groove bottom 13.1 shown in FIG. 1. The internally clamping rectangular seal 40 is thus also radially guided within the groove 13 in the area of its joint 42.

The radially outer surfaces of the prongs 53 of the fork 52 form a contact face 48.2 directed outwards. It is offset radially inwards relative to the outer surface 40.4 of the rectangular seal 40, thus exposing a mounting area 56 for the cover section 54 of the tee 58.

Figure 5:
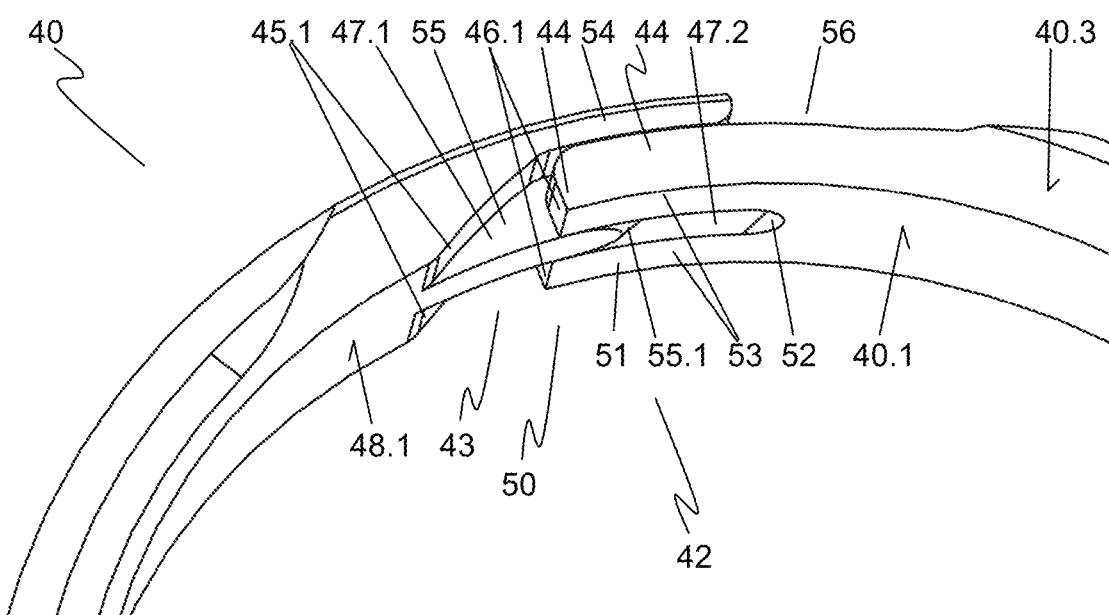
FIG. 5 shows a perspective view of the I-buckle shown in FIGS. 3 and 4 having the first first-contact sections.

FIG. 5 shows a perspective view of the I-buckle 50 shown in FIGS. 3 and 4 with the first first-contact sections 46.1 as a section of the internally clamping rectangular seal 40.

The first first-contact sections 46.1 are rounded towards the first contact ramps 45.1.

To install the internally clamping rectangular seal 40 in the groove 13 shown in FIG. 1, the latter is prestressed by a normal force preferably acting radially along the entire circumference in such a way that its outer radius is reduced to such an extent that the internally clamping rectangular seal 40 can be inserted into the shaft bore 12 of the housing 10. During prestressing, the ring-end sections 43, 44 of the joint 42 are moved towards each other in the circumferential direction. According to the invention, provision is made that the present first initial contact sections 46.1 and the first contact ramps 45.1 establish the first contact acting in the circumferential direction between the ring-end sections 43, 44. The first contact ramps 45.1 are oriented obliquely to the circumferential direction and obliquely to the radial direction. In the I-buckle 50 shown in FIG. 5, the first contact ramps 45.1 are inclined towards the inner clamping surface 40.1 of the rectangular seal 40 with respect to a circumferentially extending abutting direction of the second ring-end section 44. When the first initial contact sections 46.1 make contact with the first contact ramps 45.1, the first initial contact sections 46.1 slide along the first contact ramps 45.1 when the radius of the internally clamping rectangular seal 40 is further reduced. As a result, the first ring-end section 43, on which the first contact ramps 45.1 are formed, is displaced radially outwards, and the second ring-end section 44, on which the first first-contact sections 46.1 are formed, is displaced radially inwards. The ring-end sections 43, 44 slide radially on top of each other. The bar 45 inserted into the guide 47.2 acts as a blocking element 47.1 to provide lateral, axial guidance. The outer diameter of the internally clamping rectangular seal 40 can be reduced to such an extent that the first first-contact sections 46.1 are displaced along the entire length of the first contact ramps 45.1, measured in the circumferential direction. When the outer radius of the rectangular seal 40 is further reduced, the prongs 53 of the fork 51 slide radially under the inner clamping surface 40.1 of the opposite first ring-end section 43. The internally directed and externally directed contact faces 48.1, 48.2 of the ring-end sections 43, 44 then rest against each other as shown in FIG. 4 and FIG. 5.

Advantageously, the first first-contact sections 46.1 are rounded. They can thus slide smoothly along the first contact ramps 47.1, and any snagging is reliably prevented.

Figure 6:
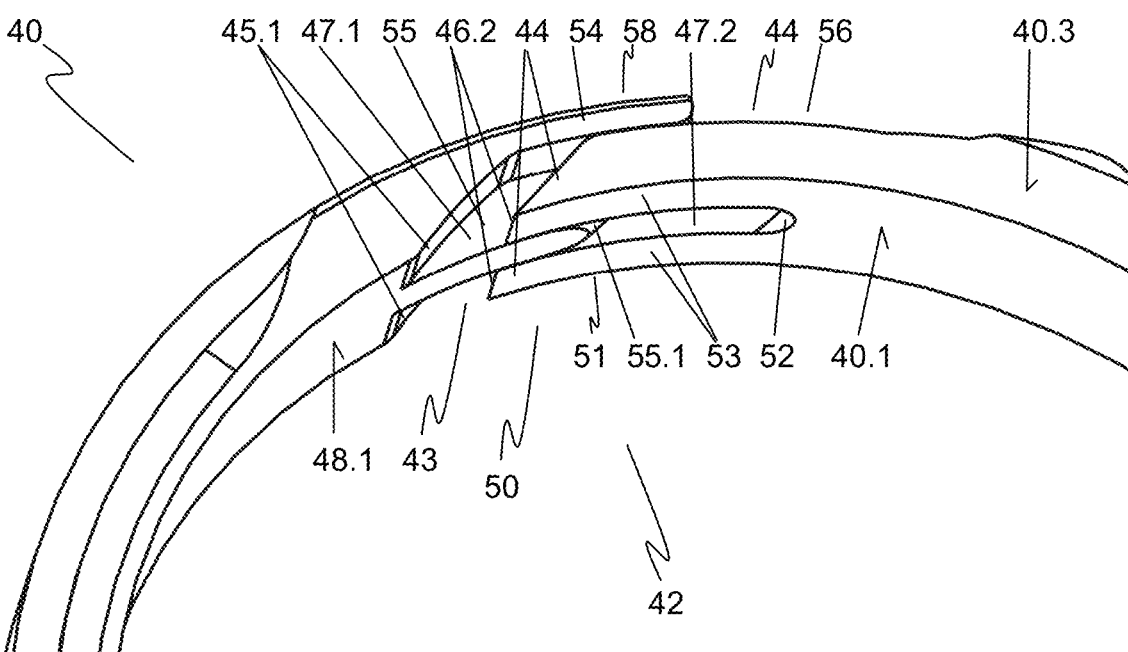
FIG. 6 shows a perspective view of an I-buckle having second first-contact sections.

FIG. 6 shows a perspective view of an I-buckle 50 with second first-contact sections 46.2.

The second first-contact sections 46.2 are formed as slopes oriented to match the first contact ramps 47.1. When the rectangular seal 40 is prestressed and its outer diameter is reduced as a result, the second first-contact sections 46.2 meet the first contact ramps 47.1. When the outer diameter of the rectangular seal 40 is further reduced, the second first-contact sections 46.2 slide along the first contact ramps 45.1. This causes the ring-end sections 43, 44 to be radially displaced with respect to each other, as described with respect to FIG. 5. Advantageously, the first contact ramps 45.1 and the second initial contact sections 46.2, which are inclined to match the first contact ramps 45.1, form large contact areas when they meet. This permits the smooth mutual displacement of the first contact ramps 45.1 and the second first-contact sections 46.2. The surface pressure between the first contact ramps 45.1 and the second first-contact sections 46.2 is kept comparatively low even when high forces act in the circumferential direction. Deformation of the ring-end sections 43, 44 in the area of the first contact ramps 45.1 and the second first-contact sections 46.2 can be avoided in this way, even in the case of rectangular seals 40 made of plastic, which is comparatively soft compared with metal.

The orientation of the first contact ramps 45.1 shown in FIGS. 3 to 6 ensures that when the internally clamping rectangular seal 40 is prestressed, the first ring-end section 43 is displaced radially outwards and the second ring-end section 44 is displaced radially inwards. When inserting such a prestressed rectangular seal 40 into a shaft bore shown in FIG. 1, the outer first ring-end section 43 first snaps into the groove 13. The inner second ring-end section 44 is subsequently inserted into the groove 13. The order in which the ring-end sections 43, 44 are inserted into the groove 13 is clearly determined by the orientation of the first contact ramps 45.1. This permits easy assembly of the internally clamping rectangular seal 40, because it is not necessary to pay attention to the correct arrangement of the ring-end sections 43, 44 relative to each other during prestressing. The insertion bevels 40.2 provided on both ends, as shown in FIG. 2, permit the rectangular seal to be inserted into groove 13 in both possible axial orientations. It is thus possible to mount the internally clamping rectangular seal 40 in a non-directional manner.

Figure 7:
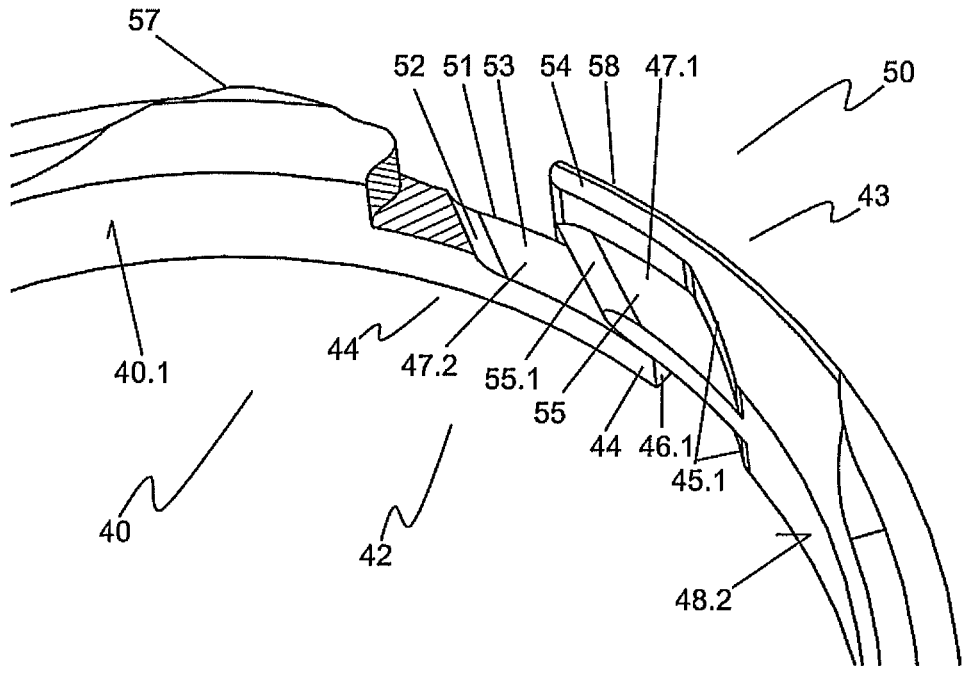
FIG. 7 shows a partially cutaway perspective view of an I-buckle having an angled leading bar edge.

FIG. 7 shows a partially sectioned perspective view of an I-buckle 50 with an angled front bar edge 55.1 of the bar 55. The leading bar edge 55.1 is oriented obliquely to the circumferential direction and oblique to the radial direction of the rectangular seal 40. It extends offset in the circumferential direction to match the inclination of the first contact ramps 45.1. The base of the fork 52 of the fork 51 of the I-buckle 50 is also disposed at an angle matching that of the front bar edge 55.1.

According to the invention, when the rectangular seal 40 is prestressed with a reduction of its outer diameter, the first contact in the circumferential direction occurs between the ring-end sections 43, 44 and there between the first initial contact sections 46.1 and the first contact ramps 45.1. For this purpose, the distance measured in the circumferential direction from the first first-contact sections 46.1 to the first contact ramps 45.1 is selected to be smaller than the distance from the front bar edge 55.1 to the base of the fork 52. The slanted design of the front bar edge 55.1 and the base of the fork 52 ensures that the front bar edge 55.1 does not touch the base of the fork 52, while the first first-contact sections 46.1 slide along the first contact ramps 45.1.

It is conceivable to provide the distance, measured in the circumferential direction, between the obliquely oriented front bar edge 55.1 and the obliquely oriented base of the fork 52 to be equal to the distance between the first first-contact sections 46.1 and the first contact ramps 45.1. When the internally clamping rectangular seal 40 is prestressed, the first first-contact sections 46.1 slide along the first contact ramps 45.1 and the leading bar edge 55.1 slides along the base of the fork 52. Owing to the same inclination of the first contact ramps 45.1, the front bar edge 55.1 and the base of the fork 52, relative to the radial direction and the circumferential direction, the formed contact surfaces slide on top of each other in the same direction. The additional sliding surface provides an improved guidance of the motion of the ring-end sections 43, 44 relative to each other. The risk of the internally clamping rectangular seal 40 breaking during assembly is reduced.

FIGS. 5 to 9 show variants of the embodiment for forming the slopes and the counterpart extending on top thereof to form a spiral arrangement of the ring in a plane viewed axially. In principle, the sliding motion can occur on one of these contours or on both simultaneously.

Figure 8:
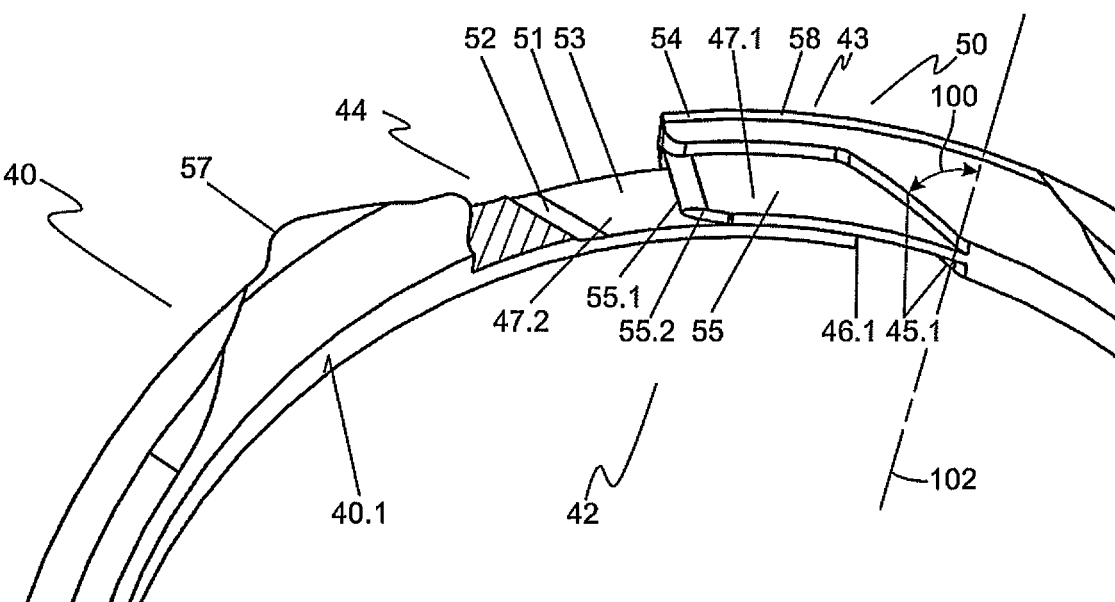
FIG. 8 shows a partially cut perspective view of an I-buckle having a leading bar edge extending in the radial direction.

FIG. 8 shows a partially sectioned perspective view of an I-buckle 50 with a front bar edge 52.1 of the bar 52 extending in the radial direction. The chamfer 55.2 is provided at the transition from the front bar edge 52.1 to the surface of the bar 55 facing radially inwards. The base of the fork 52 is oriented obliquely with respect to the circumferential direction and the radial direction of the rectangular seal 40. During prestressing, the first initial contact sections 46.1 and the first contact ramps 45.1 establish the first mechanical contact between the ring-end sections 43, 44 in the circumferential direction. The distance between the front bar edge 55.1 and the base of the fork 52 is selected such that they do not touch each other when the rectangular seal 40 is prestressed. For this purpose, the corner formed between the front bar edge 45.1 and the radially inner surface of the bar 55 is offset radially outwards by the chamfer 55.2. As shown in FIG. 8, the contact ramps 45.1 are inclined at an angle 100 relative to the radial direction 102. As previously noted the angle 100 may be in a range of from 30° to 80°, preferably of 45° to 80°.

Figure 9:
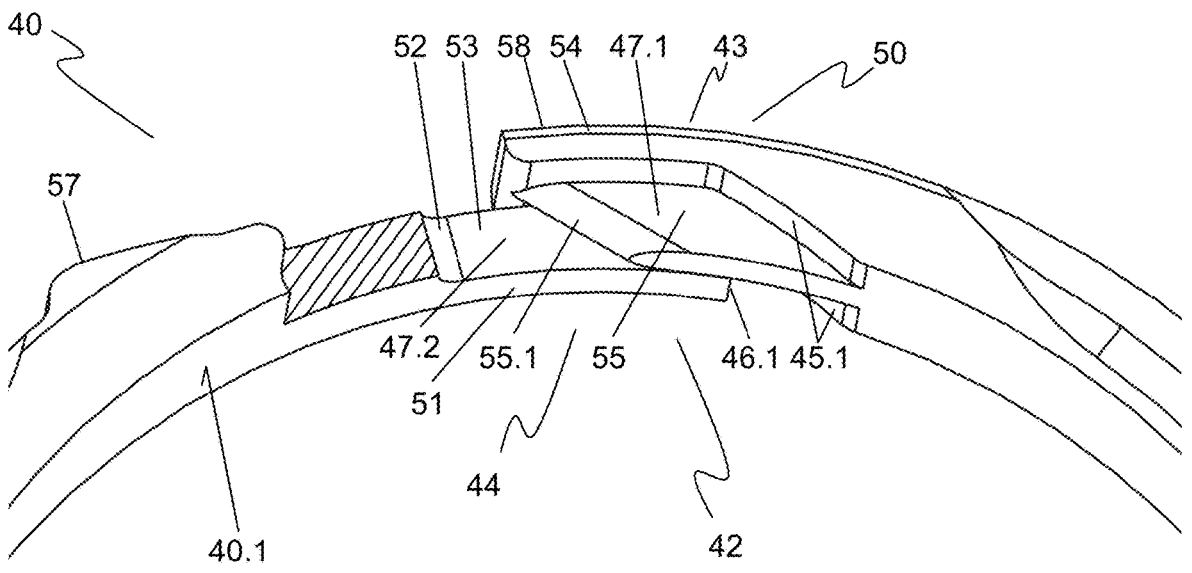
FIG. 9 shows a partially cutaway perspective view of an I-buckle having a straight base of the fork.

FIG. 9 shows a partially cut perspective view of an I-buckle 50 with a straight base of the fork 52. The front bar edge 55.1 is formed at an angle with respect to the circumferential direction and the radial direction to match the orientation of the first contact ramps 45.1. Here, too, when the rectangular seal is prestressed, the initial contact pointing in the circumferential direction occurs between the first initial contact sections 46.1 and the first contact ramps 45.1. The oblique design of the front bar edge 55.1 prevents further contact between the ring-end sections 43, 44 pointing in the circumferential direction.

Figure 10:
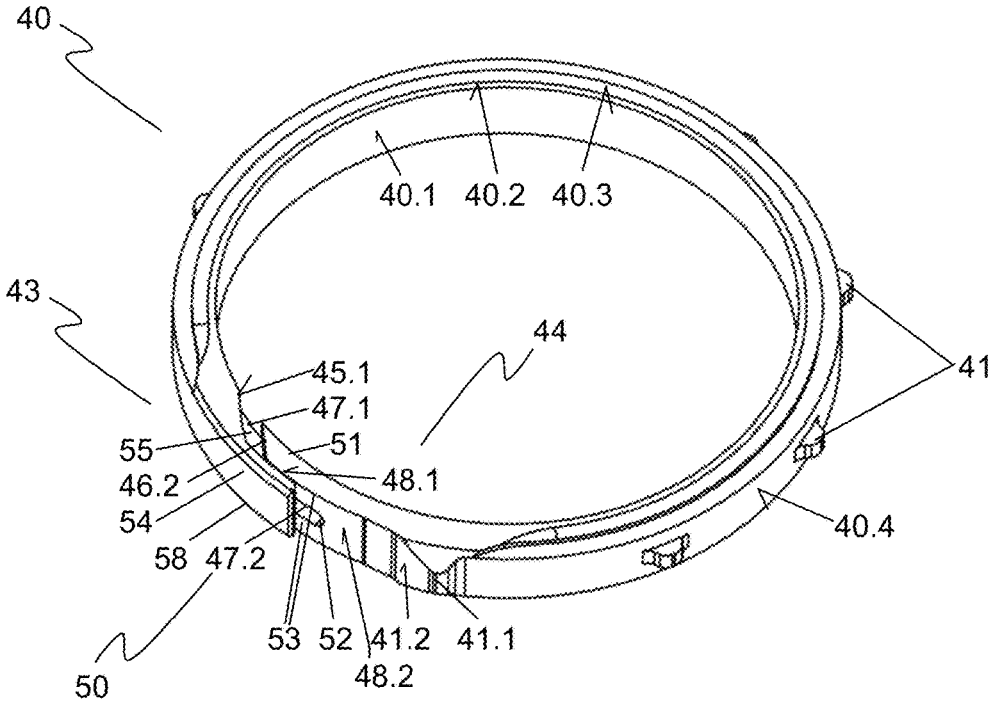
FIG. 10 shows a perspective view of an internally clamping rectangular seal having with a widened first centering cam.

FIG. 10 shows a perspective view of the internally clamping rectangular seal 40 with a widened first centering cam 41.1.

The first centering cam 41.1 is formed on the outer surface 40.4 of the rectangular seal 40 in the area of the second ring-end section 44, facing away from the first ring-end section 43. When the internally clamping rectangular seal 40 is prestressed, the cover section 54 of the first ring-end section 43 slides radially outwards along a provided inclined surface 41.2 onto the first centering cam 41.1.

The first centering cam 41.1 extends in the axial direction across the entire width of the internally clamping rectangular seal 40. In this way, it ensures that the two ring-end sections 43, 44 are neatly guided on top of each other when the rectangular seal 40 is prestressed and are not axially offset from each other, as would be the case with a centering cam 41 of narrow design. This is particularly true since, when the rectangular seal 40 is fully prestressed, the bar 55 no longer engages with the guide 47.2 formed between the prongs 53 of the fork 51, thus eliminating the axial blockage between the two ring-end sections 43, 44.

Figure 11:
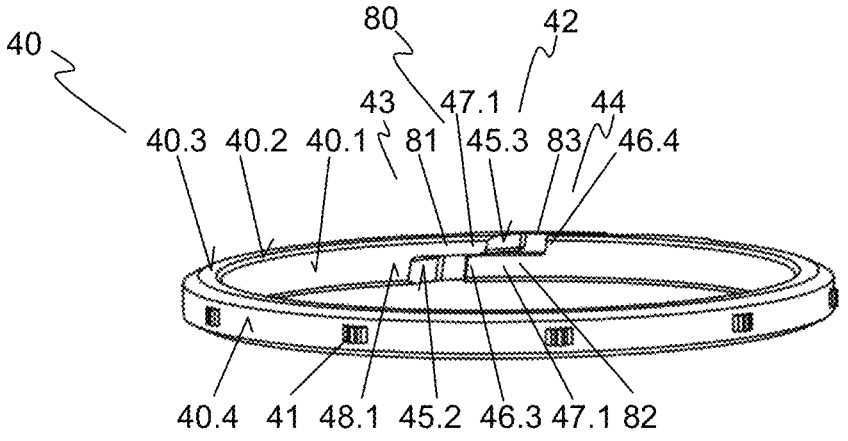
FIG. 11 shows a perspective view of an internally clamping rectangular seal having a single-step buckle.

FIG. 11 shows a perspective view of the internally clamping rectangular seal 40 with a single-step buckle 80 as a further buckle form suitable for the application of the invention.

The single-step buckle 80 forms the joint 42 of the internally clamping rectangular seal 40. It connects the two ring-end sections 43, 44.

Figure 12:
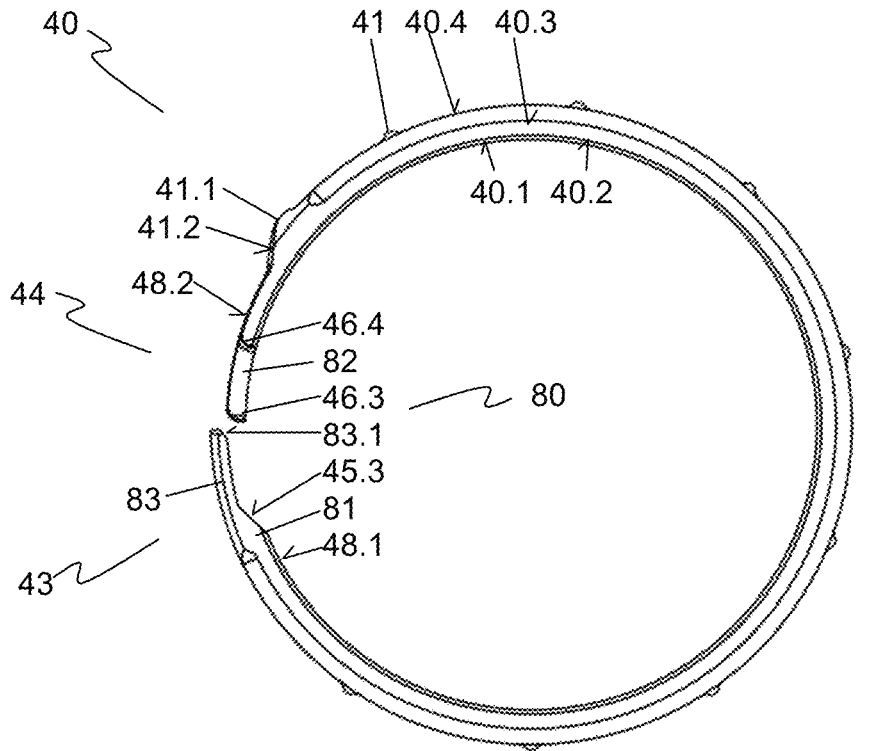
FIG. 12 shows a first side view of the internally clamping rectangular seal having a single-step buckle shown in FIG. 11 in a non-prestressed state.

FIG. 12 shows a first side view of the internally clamping rectangular seal 40 having a single-step buckle 80 shown in FIG. 11 in a non-prestressed state.

As can be seen in FIGS. 11 and 12, the first ring-end section 43 forms a second cover section 83. The second cover section 83 is disposed radially outwards and forms a continuous extension of the outer surface 40.4 of the rectangular seal 40 with its surface facing radially outwards. Measured in the radial direction, the second cover section 83 is tapered relative to the sections of the internally clamping rectangular seal 40 located outside the single-step buckle 80. Pointing radially inwards, a first lateral guide 81 is formed sectionally on the second cover section 83. The first lateral guide 81 is bar-shaped. It extends along an edge of the cover section 83 pointing in the axial direction.

As can be seen in particular from FIG. 12, the second ring-end section 44 adjacent to the first centering cam 41.1 is also tapered in the radial direction relative to sections of the rectangular seal 40 located outside the area of the single-step buckle 80. It rests on a smaller radius compared to the first ring-end section 43. With its radially inwardly facing surface, the second ring-end section 44 forms a continuous extension of the inner clamping surface 40.1 of the internally clamping rectangular seal 40.

The second ring-end section 44 is step-shaped in a circumferential direction. In this case, a section of the second ring-end section 44 opposite to the first lateral guide 81 in the circumferential direction is shortened relative to a second lateral guide 82 disposed laterally thereto in the axial direction. When the internally clamping rectangular seal 40 is prestressed with a resulting reduction in its outer diameter, the two lateral guides 81, 82 are moved past each other in an axially offset manner, as can be seen in particular in FIG. 11. The surfaces of the lateral guides 81, 82 facing each other rest against each other. This provides axial guidance of the ring-end sections 43, 44 relative to each other. The lateral guides 81, 82 thus form blocking elements 47.1 blocking any axial displacement of the ring-end sections 43, 44 relative to each other.

As can be seen from FIG. 11, a second and a third contact ramp 45.2, 45.3 are formed on the first ring-end section 43. The third contact ramp 45.3 forms the circumferential termination of the first lateral guide 81. The second contact ramp 45.2 is disposed laterally from the first lateral guide 81 and set back in the circumferential direction relative to the third contact ramp 45.3.

At its end facing the first ring-end section 43, the second lateral guide 82 forms a third first-contact section 46.3. The end of the second ring-end section 44 that is set back in the circumferential direction relative to the second lateral guide 82 is terminated by a fourth first-contact section 46.4. The third first-contact section 46.3 is disposed circumferentially opposite to the second contact ramp 45.2. The fourth first-contact section 46.4 is disposed circumferentially opposite to the third contact ramp 45.3.

FIG. 12 shows the internally clamping rectangular seal in its open state.

Figures 13, 14:
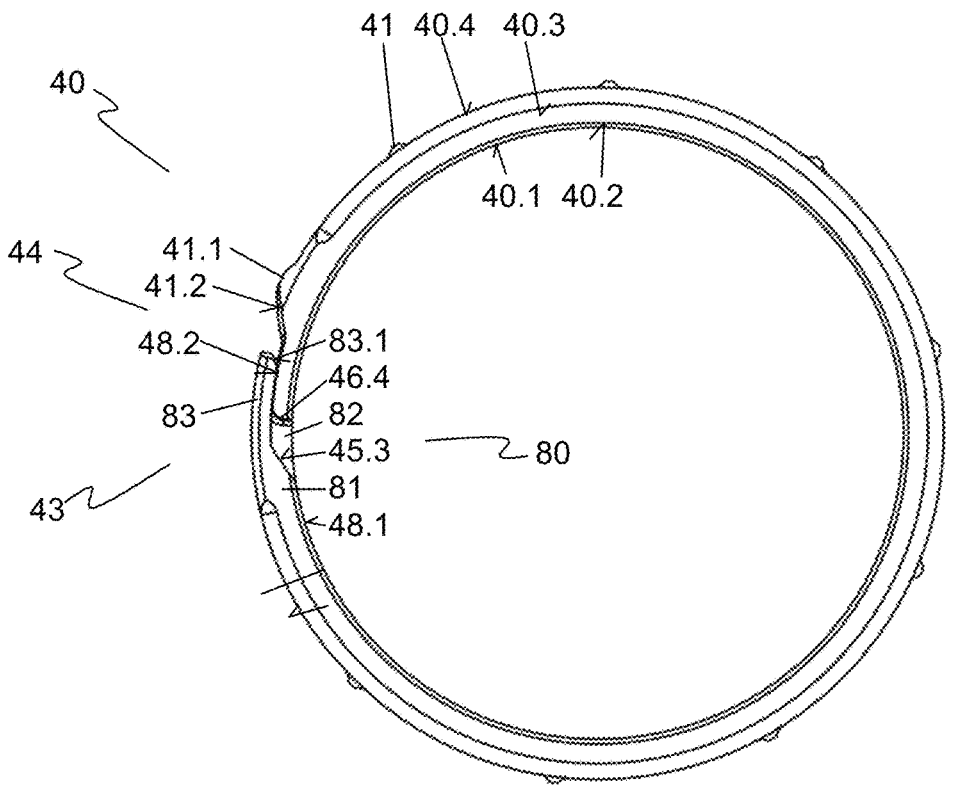
FIG. 13 shows a first side view of the internally clamping rectangular seal having an I-buckle shown in FIGS. 11 and 12 in a partially prestressed state.
FIG. 14 shows a second side view of the internally clamping rectangular seal having a single-step buckle shown in FIGS. 11, 12 and 13 in a non-prestressed state.

FIG. 13 shows the first side view of the internally clamping rectangular seal having an I-buckle shown in FIGS. 11 and 12 in a partially prestressed state.

As the internally clamping rectangular seal 40 is prestressed to have a smaller outer radius, the third first-contact section 46.3 moves towards the second contact ramp 45.2 and the fourth first-contact section 46.4 moves towards the third contact ramp 45.3. The second and third contact ramps 45.2, 45.3 are inclined towards the inner clamping surface 40.1 of the rectangular seal 40 in the direction of motion of the third and fourth first-contact sections 46.3, 46.4. The third and fourth first-contact sections 46.3, 46.4 are rounded, as shown in FIG. 12.

FIG. 14 shows a second side view of the internally clamping rectangular seal 40 shown in FIGS. 11, 12 and 13, wherein the single-step buckle 80 is in the non-prestressed state as shown from the opposite perspective in FIG. 12.

FIG. 15 shows a second side view of the internally clamping rectangular seal 40 shown in FIGS. 11 to 14, wherein the single-step buckle 80 is in a partially prestressed state corresponding to the illustration in FIG. 13 from the opposite viewing direction.

Starting from the non-prestressed state shown in FIGS. 12 and 14, the internally clamping rectangular seal 40 is prestressed during assembly by radially applied forces. In the process, its outer diameter decreases and the ring-end sections 43, 44 move towards each other. In the partially prestressed state as shown in FIG. 13 and FIG. 15, the second ring-end section 44 is partially displaced in the radial direction below the second cover section 83 of the opposite first ring-end section 43. The lateral guides 81, 82 of the opposing ring-end sections 43, 44 abut each other in the axial direction.

If the internally clamping rectangular seal 40 is further prestressed compared to the illustrations in FIGS. 13 and 15, the third first-contact section 46.3 meets the second contact ramp 45.2 and the fourth first-contact section 46.4 meets the third contact ramp 45.3. The third and fourth first-contact sections 46.3, 46.4 slide along the second and third contact ramps 45.2, 45.3. As a result, the first ring-end section 43 is displaced radially outwards and the second ring-end section 44 is displaced radially inwards.

The orientation of the second and third contact ramps 45.2, 45.3 at an angle to the circumferential direction, leading towards the radial direction of the rectangular seal 40 and towards the inner clamping surface 40.1, ensures that the first ring-end section 43 is disposed radially outwards and the second ring-end section 44 is disposed radially inwards when the rectangular seal 40 is prestressed. Prestressed, the inwardly directed contact face 48.1 first ring-end section 43 rests on the contact face 48.2 of the second ring-end section 44 directed outwards. During prestressing, the circumferentially facing termination of the second cover section 83 meets the inclined surface 41.2 of the first centering cam 41.1. At the same time, the second cover section 83 slides outwards along the inclined surface 41.2. Advantageously, a slope 83.1 is formed on the second cover section 83, with which the second cover section 83 meets the inclined surface 41.1. A uniform sliding motion is achieved in this way.

FIG. 16 shows a perspective view of an assembly tool 60. This assembly tool 60 has a handle 61, to which a slotted gripper arm 62 is molded. Presently, four segments of the slotted gripper arm 62 are separated from each other along the longitudinal extension of the assembly tool 60 by slots 62.1. It is conceivable to provide more or fewer than four segments. Opposite to the handle 61, at the end a gripper 63 is molded to two radially opposite segments. The gripper 63 is shaped like a circular section and forms a mounting groove for holding an internally clamping rectangular seal 40 shown in FIGS. 2 to 15.

FIG. 17 shows a sectional view of the assembly tool 60 shown in FIG. 16 having a ring holder 64. The ring holder 64 is designed to be plate-shaped. It has a ring mount 64.1 on one surface, into which a rectangular seal 40 shown in FIGS. 2 to 15, is inserted.

The assembly tool 60 can be used to remove the rectangular seal 40 from the ring mount 64.1. For this purpose, the gripper 63 of the assembly tool 60 is inserted axially into the rectangular seal 40. Owing to their face chamfers, the slotted gripper arms 62 are compressed by the assembly motion until the mounting groove is displaced towards the rectangular seal 40. The slotted gripper arms 62 then move outwards, i.e., the rectangular seal is held in the mounting groove of the gripper 63. The assembly tool 60 can now be used to remove the rectangular seal 40 from the ring holder 64.

Figure 18:
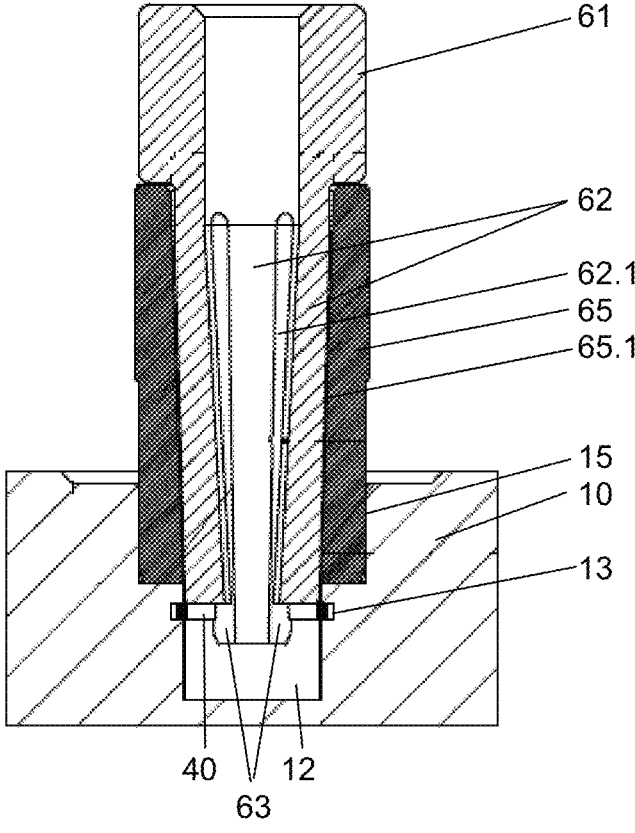
FIG. 18 shows a sectional view of the assembly tool shown in FIGS. 16 and 17 having a sleeve.

FIG. 18 shows a sectional view of the assembly tool 60 shown in FIGS. 16 and 17 having a sleeve 65. The sleeve 65 encompasses a tapered aperture 65.1. The slotted gripping arm 62 of the assembly tool 60 is inserted into the tapered aperture 65.1. As a result, the segments of the slotted gripper arm 62 are compressed to match the taper of the tapered aperture 65.1.

The end of the sleeve 65 opposite the handle 61 of the assembly tool 60 is inserted in a sleeve mount 15 on a housing 10, as shown in modified form in FIG. 1. There, the sleeve mount 15 is designed as a shoulder of a shaft bore 12. The groove 13 for mounting the internally clamping rectangular seal 40 is provided in the shaft bore 12.

To assemble an internally clamping rectangular seal 40, it is first picked up by the assembly tool 60 as described with respect to FIG. 17. The sleeve 65.1 is then inserted into the sleeve mount 15 at the housing 10. In the next step, the gripper 63 of the slotted gripper arm 62 and the internally clamping rectangular seal 40 held thereon is inserted into the open end of the sleeve 65.1. The diameter of the tapered aperture 65.1 at its end facing away from the housing 10 matches at least the outer diameter of the housing bore and its centering cams 41, 41.1 disposed on the outer surface 40.4. The rectangular seal 40 is inserted into the sleeve 65 along the former's axial direction. When the rectangular seal 40 is pushed into the tapered aperture 65.1, it is subjected to a radially acting normal force along its entire circumference. This results in a reduction in the outer diameter of the rectangular seal 40. In the process, the ring-end sections 43, 44 slide radially on top of each other matching to the inclination of the contact ramp 45.1, 45.2, 45.3 or the contact ramps 45.1, 45.2, 45.3.

At its end of the sleeve 65 facing the housing 10, the diameter of the tapered aperture 65.1 matches that of the shaft bore 12 or the housing bore, or it is selected to be slightly smaller. The rectangular seal 40 can thus be pushed out of the sleeve 65 into the shaft bore 12. The assembly tool 60 is now used to move the rectangular seal 40 to the groove 13. There the pressure on the rectangular seal 40 can be released. For this purpose, first the radially outer ring-end section 43, 44 and then the radially inner ring-end section 43, 44 snap into the groove 13.

The orientation of the contact ramp 45.1, 45.2, 45.3 or contact ramps 45.1, 45.2, 45.3 determines which of the ring-end sections 43, 44 is arranged radially outwards and which is arranged radially inwards during prestressing. It also determines the sequence in which the ring-end sections 43, 44 are inserted into the groove 13. Thus, internally clamping rectangular seals 40 requiring a predetermined sequence for joining the buckle ends can be inserted into an externally located groove 13. In this case, it is not necessary to ensure that the ring-end sections 43, 44 are arranged in the correct radial sequence relative to each other during pre-stressing. Because the rectangular seals 40 preferably have an insertion bevel 40.4 on both ends, they can be inserted into the groove 13 in both possible axial orientations. This permits for non-directional assembly of the internally clamping rectangular seal 40, wherein buckle geometries may be provided, which require a predetermined sequence for joining the buckle ends. This makes for an easy and cost-effective assembly of externally clamping rectangular seals 40, which have low leakage rates owing to the buckle geometry used.

During the insertion of the rectangular seal 40 into the sleeve 15, the assembly tool 60 subjected the former to an axially acting force. If at least one axially acting blocking element is provided between the ring-end sections 43, 44, the ring-end sections 43, 44 cannot move axially relative to one another or can only move relative to one another across a permissible range. The rectangular seal 40 thus deforms according to a flat spiral, in which one ring-end section 43, 44 is located radially on top of the other.

In the case of internally clamping rectangular seals 40, the contact ramps 45.1, 45.2, 45.3 can be implemented on almost all asymmetric buckle shapes. This means that buckle types which were previously reserved for externally clamping rectangular seals because of their easier installation can be used for internally clamping rectangular seals 40. These types of buckles preferably have low leakage rates. Particularly preferably, the internally clamping rectangular seals according to the invention can be formed from polymers. For instance, it is conceivable to manufacture the internally clamping rectangular seals from high-temperature thermoplastics, such as polyether ketones (PEK, PEEK) or polyimides (PE, PBMI, PAI, PE). These can particularly advantageously be mixed with various fillers and reinforcing materials. High-temperature thermoplastics can be injection molded or otherwise molded via the melt. It is also conceivable to manufacture the internally clamping rectangular seals 40 with this buckle modification from polytetrafluoroethylene (PTFE) or cast materials.

What is claimed is:

1. An internally clamping seal for sealing a shaft with respect to a housing, wherein the seal can be inserted into a groove disposed circumferentially in a shaft bore of the housing, the seal comprising:

a seal ring including a first ring-end section and a second ring end section, the first and second ring-end sections forming a joint interrupting the seal ring along a circumferential direction, the seal ring including an outer surface facing radially outwards, an inner clamping surface facing radially inwards, and opposing flank surfaces facing in opposite axial directions;

wherein the first ring-end section includes two contact ramps oriented obliquely with respect to both the circumferential direction and the radial direction of the seal ring and spaced circumferentially and separated axially from each other, and the first ring-end section includes a cover forming a continuous extension of the outer surface of the seal ring, the cover extending circumferentially past both of the two contact ramps;

wherein two contact sections are disposed on the second ring-end section opposite to the two contact ramps; and wherein both of the contact ramps are inclined in the same circumferential direction such that, when a radius of the seal ring is reduced by prestressing the seal ring, the second ring-end section is deflected inwards such that the ring-end sections slide radially on top of each other and form a flat spiral;

wherein both of the contact ramps face toward the inner clamping surface of the seal ring; and wherein the outer surface of the seal ring extends circumferentially past both of the contact ramps.

2. The seal of claim 1, wherein:
the two contact ramps are inclined at an angle in a range of from about 30 degrees to about 80 degrees relative to a radial direction intersecting the two contact ramps.

3. The seal of claim 1, wherein:
the two contact ramps are inclined at an angle in a range of from about 45 degrees to about 80 degrees relative to a radial direction intersecting the two contact ramps.

4. The seal of claim 1, wherein:
the two contact ramps have a constant angle of inclination relative to the radial direction along an entire extension of the two contact ramps.

5. The seal of claim 1, wherein:
the two contact ramps on the first ring-end section are inclined toward the inner clamping surface of the seal ring with reference to a joining circumferential movement of the second ring-end section when the radius of the seal ring is reduced by prestressing of the seal ring.

6. The seal of claim 1, wherein:
the two contact sections are rounded off facing the two contact ramps.

7. The seal of claim 1, wherein:
the two contact sections each include a chamfer oriented to match an inclination of a respective one of the two contact ramps.

8. The seal of claim 1, wherein:
the two contact ramps and the two contact sections each merge into respective contact faces extending in the circumferential direction such that when the radius of the seal ring is reduced by prestressing the contact faces contact each other.

9. The seal of claim 1, wherein:
a plurality of centering cams circumferentially spaced from one another are arranged on the outer surface of the seal ring, at least one of the centering cams extending transversely to the circumferential direction across a width of the seal ring measured in the axial direction.

10. The seal of claim 1, wherein:
the seal ring includes two insertion bevels, each insertion bevel being oriented obliquely from one of the flank surfaces toward the inner clamping surface to define a transition from the respective flank surface to the inner clamping surface.

11. The seal of claim 1, wherein:
the seal ring is formed at least partially from a high-temperature thermoplastic or from polytetrafluoroethylene.

12. The seal of claim 11, wherein:
high-temperature thermoplastic or polytetrafluoroethylene is mixed with at least one filler and/or a reinforcing material.

13. The seal of claim 1, wherein:
the seal ring is formed at least partially from a polyether ketone or a polyimide.

14. The seal of claim 1, wherein:
the seal ring is formed of a metallic casting material.

15. The seal of claim 1, wherein:
the ring-end sections comprise meshing buckle elements configured to provide a detachable form-fitting connection of the ring-end sections acting in the circumferential direction and/or in the radial direction and/or in the axial direction.

16. The seal of claim 1, wherein:
the second ring-end section includes a radially inward facing surface forming a continuous extension of the inner clamping surface of the seal ring.

17. The seal of claim 1, wherein:
the first ring-end section is step-shaped and includes a first lateral guide, the first lateral guide circumferentially spacing and axially separating the two contact ramps of the first ring-end section; and
the second ring-end section is step-shaped and includes a second lateral guide, the first and second lateral guides being configured to block axial displacement of the ring-end sections relative to each other.

18. The seal of claim 17, wherein:
the first and second lateral guides are configured such that when the radius of the seal ring is reduced by prestressing the seal ring the first and second lateral guides are moved past each other in an axially offset manner.

19. The seal of claim 17, wherein:
the first and second lateral guides are configured such that surfaces of the first and second lateral guides facing each other rest against each other axially.

20. An internally clamping seal for sealing a shaft with respect to a housing, wherein the seal can be inserted into a groove disposed circumferentially in a shaft bore of the housing, the seal comprising:
a seal ring including a first ring-end section and a second ring end section, the first and second ring-end sections forming a joint interrupting the seal ring along a circumferential direction, the seal ring including an outer surface facing radially outwards, an inner clamping surface facing radially inwards, and opposing flank surfaces facing in opposite axial directions;

wherein the first ring-end section includes two contact ramps oriented obliquely with respect to both the circumferential direction and the radial direction of the seal ring and spaced circumferentially from each other, and the first ring-end section includes a cover forming a continuous extension of the outer surface of the seal ring, the cover extending circumferentially past both of the two contact ramps;

wherein two contact sections are disposed on the second ring-end section opposite to the two contact ramps;

wherein both of the contact ramps are inclined in the same circumferential direction such that, when a radius of the seal ring is reduced by prestressing the seal ring, the second ring-end section is deflected inwards such that the ring-end sections slide radially on top of each other and form a flat spiral; and wherein the second ring-end section includes a centering cam projecting radially outward from the outer surface of the seal ring, the centering cam including an inclined surface facing the first ring-end section and configured such that when the radius of the seal ring is reduced by prestressing the seal ring a free end of the first ring-end section engages the inclined surface.

* * * * *